United States Patent [19]

Harashima

[11] Patent Number: 5,100,744
[45] Date of Patent: Mar. 31, 1992

[54] FUEL CELL POWER GENERATION SYSTEM

[75] Inventor: Koichi Harashima, Kawasaki, Japan

[73] Assignee: Fuji Electric Co., Ltd., Kawasaki, Japan

[21] Appl. No.: 713,314

[22] Filed: Jun. 11, 1991

[30] Foreign Application Priority Data

Jun. 20, 1990 [JP] Japan .................. 2-161768

[51] Int. Cl.⁵ .............................................. H01M 8/04
[52] U.S. Cl. .................................. 429/22; 429/34
[58] Field of Search .............................. 429/22-25, 429/34, 38, 39

[56] References Cited

U.S. PATENT DOCUMENTS

| | | | |
|---|---|---|---|
| 4,046,956 | 9/1977 | Fanciullo | 429/20 |
| 4,463,068 | 7/1984 | Cohn et al. | 429/34 |
| 4,615,955 | 10/1986 | Amakawa et al. | 429/34 |
| 4,623,596 | 11/1986 | Kamoshita | 429/34 X |
| 4,666,755 | 5/1987 | Shigeta | 429/34 X |
| 4,751,062 | 6/1988 | Kaufman et al. | 429/41 X |

Primary Examiner—Anthony Skapars
Attorney, Agent, or Firm—Spencer & Frank

[57] ABSTRACT

A single fuel cell stack includes a plurality of divided fuel chambers and a plurality of divided air chambers partitioned or a plurality of fuel cell stacks are connected to each other so that respective fuel chambers and air chambers are connected in series to form a plurality of series fuel chambers and a plurality of an series air chambers. Reaction gas is supplied to selected divided fuel chambers and divided air chambers, or to selected series fuel chambers or series air chambers, selected depending on the stage of load factor.

4 Claims, 7 Drawing Sheets

FUEL CELL POWER GENERATION SYSTEM

BACKGROUND OF THE INVENTION

1. Field of the Invention

The present invention relates to a fuel cell power generation system including a fuel cell stack, a fuel processing apparatus, an air supply apparatus, and a power varying apparatus. More particularly, the present invention relates to a fuel cell power generation system which has improved reaction gas supply and exhaust mechanisms and which can control effective power generation surface area corresponding to load ratio.

2. Description of the Prior Art

FIG. 1 is a perspective view showing an example of the structure of the unit cell of a well known fuel cell. FIG. 2 is a plan view schematically showing the conventional fuel cell stack. FIG. 3 is a system flow chart in a simplified view showing the well known construction of a fuel cell power generation system.

As shown in FIG. 1, a unit cell 100 includes a matrix 101 holding an electrolyte, and a pair of a fuel electrode 102 and an air electrode 103 together sandwiching the matrix 101. The pair of the electrodes 102 and 103 are each permeable to gases and provided with an electrode catalyst layer (not shown) on their respective sides contacting the matrix 101. On the surface of the fuel electrode 102 opposite to the matrix are formed a plurality of fuel gas passages 102A in the form of a groove. On the other hand, on the surface of the air electrode 103 opposite to the matrix are formed a plurality of air passages 103A. The fuel as passages 102A and air passages 103A are arranged perpendicular to each other.

A plurality of the unit cell 100 having the aforementioned construction are laminated alternately with gas-impermeable separators 104 to form a fuel cell stack 1 as schematically shown in FIG. 2. As shown in FIG. 2, a pair of inlet and outlet manifolds 2A and 2B for circulating the fuel gas are attached sealingly on side wall surfaces of the stack 1 where both ends of a number of the fuel gas passages 102A open. The fuel gas inlet manifold 2A, the fuel gas outlet manifold 2B and a number of the fuel gas passage 102A together form a fuel chamber 2. Also, a pair of inlet and outlet manifolds 3A and 3B for air circulation are attached sealingly to side wall surfaces of the stack 1 that are perpendicular to the side surfaces to which the manifolds 2A and 2B are attached sealingly. The air inlet manifold 3A, the air outlet manifold 3B and a number of air passages 103A together form an air chamber 3.

In the stack 1 having the aforementioned construction, as shown FIG. 3, the fuel chamber 2 is connected to a fuel reformer 5. Fuel gas such as fossil fuel or hydrocarbon fuel stored in a raw material tank 4 is sent to the reformer 5 through a pump 8A. Hydrogen-rich fuel gas GF produced by steam reforming reaction in the reformer 5 is fed to the fuel chamber 2. On the other hand, air for reaction GA is fed to the air chamber 3 by a blower 8C, and off-air OA is discharged from the air chamber 3. As a result, the stack 1 performs electromotive reaction due to electrochemical reaction between the pair of electrodes 102 and 103, and the electric power generated is supplied to a load 9 after being adjusted for its output current waveform, voltage or the like by a power transformer 6. Off-gas GO discharged from the fuel chamber 2 is sent to a burner of the fuel reformer 5 and is mixed with air sent from the blower 8B to burn. The heat thus generated is utilized as heat source for reaction heat required for the steam reforming reaction. The fuel processing apparatus including the power transformer 6, the air feeder mainly composed of the blower 8C, the fuel tank 4, the pump 8, the fuel reformer 5, and the air blower 8B, is controlled by a controlling apparatus 7. The controlling apparatus 7 also controls the amount of power generated by the stack 1, output electric current from the power transformer 6 and the like depending on the power required by the load 9.

Generally, there are some limitational conditions on the operation of the fuel cell power generating system. One of them is a condition that the fuel cell must not be exposed to a high potential (0.8 V/cell or higher) at a high temperature (about 130° C. or higher). The reason for this is as follows. That is, the catalyst layer of the electrodes of the fuel cell is made of a catalyst composed of platinum or platinum alloy carried on fine particles of carbon such as carbon black, and in the catalyst layer on the electrode particles of platinum or platinum alloy contained therein tend to be dissolved and redeposited. This redeposition results in coarsening of the particles of platinum or its alloy to reduce the surfaces of the platinum, i.e., reaction surface area. Or, the fine particles of carbon carrying thereon platinum or its alloy in the catalyst layer tend to be corroded because of high potential. As a result of this corrosion, platinum is removed from the catalyst layer to decrease the reaction surface area (surface area of platinum) in the catalyst layer. When decrease of reaction surface area occurs at such a high potential as described above, this naturally results in aggravation of the properties of the fuel cell.

In fuel cells, the output voltage V decreases according as output current I increases, which phenomenon is called V-I characteristics. When the output current I reaches a value of, for example, no more than 25% of the rated current (hereafter, expressed as "no more than 25% of load factor"), the voltage of unit cell exceeds 0.8 V, and the unit cell is exposed to a high potential. In the conventional stack where the reaction gas GF and the reaction air GA flow uniformly through a plurality of unit cells over entire electrode surface area and in addition streams flowing perpendicular to each other are formed as shown in FIG. 2, it is unavoidable that each unit cell is exposed to a high potential as high as exceeding 0.8 V/cell under a light load condition at a load factor of no higher than 25%. Therefore, it has been necessary to take a suitable countermeasure for preventing the load factor from decreasing to 25% or lower even under light load conditions. For example, a discharge resistor has been connected to the output side of the stack 1 through a switch in order to direct most part of the output current to the discharge resistor so that the apparent load factor should not decrease to 25% or lower. However, this type of countermeasure is disadvantageous in that the consumption of reformed fuel increases according as power generated is wasted, thus decreasing power generation efficiency. Further, in this countermeasure, accessories to the discharge resistor, switch and the like, or controllers therefor are necessary because of waste of electric power, which results in increase in the size of the power generation system.

In particular, in recent fuel cells, improvement of the performance of the battery has been made in order to cope with technical developments such as the use of a higher pressure reaction gas, and as a result the output voltage of fuel cells has increased to some extent, and unit cells could readily be exposed to a high potential exceeding 0.8 V/cell even at a load factor of 50% or higher, not to speak of 25% or lower.

SUMMARY OF THE INVENTION

A first object of the present invention is to provide a fuel cell power generation system which does not waste power generated.

A second object of the present invention is to provide a fuel cell power generation system which can avoid the occurrence of high potentials under light load conditions.

In order to achieve the object, according to a first aspect of the present invention, there is provided a fuel cell power generation system comprising:

a fuel cell stack made of a laminate of a plurality of unit cells, each of the unit cells having a fuel electrode and an air electrode;

a fuel processing apparatus for supplying a fuel gas to the fuel electrode of each of the unit cells in the fuel cell stack;

an air supplying apparatus for supplying air for reaction to the air electrode of the fuel cell stack;

a power transformer for adjusting output power from the fuel cell stack and supplying the output power to a load;

a plurality of fuel gas passages formed on each of the unit cells on its side surface of the fuel cell and each having an inlet port and an outlet port, and a plurality of reaction air passages formed on each of the unit cells on its side surface of the air electrode and each having an inlet port and an outlet port, the fuel gas passages being perpendicular to the air gas passages; and a pair of first manifolds provided one on a side of the inlet port of, and the other on a side of the outlet port of each of the air passages, and a pair of second manifolds provided one on a side of the inlet port of, and the other on a side of the outlet port of each of the fuel passages;

wherein each of said first and second manifolds comprises a plurality of component manifold portions divided in a direction of flow of the fuel gas or reaction air; and wherein each of said component manifold portions is provided with flow rate controlling means for controlling flow rate of each of said component manifold portions.

Here, degree of supply of the fuel gas and the reaction air to each of the plurality of the component manifold portions may be set up to one selected from stages of light load factors and switched to another after every predetermined time of operation.

According to the second aspect of the present invention, there is provided a fuel cell power generation system comprising:

at least four fuel cell stacks each made of a laminate of a plurality of unit cells, each of the unit cells having a fuel electrode and an air electrode;

a fuel processing apparatus for supplying a fuel gas to the fuel electrode of each of the unit cells in each of the four fuel cell stacks;

an air supplying apparatus for supplying reaction air to the air electrode of each of the unit cells in each of the fuel cell stacks;

a power transformer for adjusting output power from each fuel cell stack and supplying the output power to a load connected thereto;

a plurality of fuel gas passages formed on each of the unit cells on its side surface of the fuel cell and each having an inlet port and an outlet port, and a plurality of reaction air passages formed on each of the unit cells on its side surface of the air electrode and each having an inlet port and an outlet port, the fuel gas passages being perpendicular to the air gas passages; and a pair of first manifolds provided one on a side of the inlet port of, and the other on a side of the outlet port of each of the air passages, and a pair of second manifolds provided one on a side of the inlet port of, and the other on a side of the outlet port of each of the fuel passages;

wherein for at least two of said at least four fuel cell stacks, said fuel gas passages and reaction air passages, respectively, are connected in series, to form a series-connected fuel gas passage assembly having an inlet port and an outlet port, and a series-connected reaction gas passage assembly having an inlet port and an outlet port, respectively; and wherein said first manifolds on respective sides of the inlet port and the outlet port of the series-connected fuel gas passage assembly and said second manifolds on respective sides of the inlet port and outlet port of the series-connected reaction air passage assembly are each provided with flow rate controlling means for controlling flow rate of each of the first and second manifolds.

Here, degree of supply of the fuel gas or the reaction air to each of the manifolds on the side of the inlet portions may be set up to one selected from stages of light load factors and switched to another after every predetermined time of operation.

According to the present invention, a plurality of fuel gas passages and a plurality of air passages in a single stack, respectively, are divided by divided manifolds into a group of fuel gas passages and a group of air passages, the divided passages in each group being parallel to each other, and combination of the divided fuel gas passages and the divided air passages which actually supply the reaction gases can be altered depending on the stage of the load factor of the system. This construction forms streams of a fuel gas and of reaction air which cross one another perpendicularly in only over lapping portions between the divided fuel gas passages and the divided reaction air passages and allows combustion reaction to occur in the overlapping portions, thus making it possible to limit or control effective power generation surface area of the fuel cell stack. For example, when the manifold is divided into two component portions (division number=2), the effective power generation surface area can be varied in three stages, i.e., ¼ time the entire surface area, ½ time the entire surface area, and the entire surface area. By selecting the effective power generation surface area from the three stages and switching it appropriately corresponding to the load factor being no higher than 25%, 25 to 50%, and 50 to 100%, respectively, a function of controlling step-wise the amount of power generated by the stack depending on the load factor can be obtained. Therefore, according to the present invention, load factor regions where there is a danger that the unit cells in the stack are exposed to high potentials exceeding 0.8 V/cell can be reduced considerably. In addition, alteration of portions serving as effective power generation surface area in every predetermined time results in uniform service life of the entire surface of each unit cell.

Further, in the fuel cell having four or more fuel cell stacks, the series connection of the fuel gas passages and air passages, respectively, of at least two fuel cell stacks form reaction gas supply units gives rise to the same function as given by the use of the aforementioned single fuel cell stack.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The present invention will be described in greater detail with reference to the following specific embodiments which are presented by way of example and should be construed in no way as limiting the invention thereto.

Embodiment 1

Figure 1:
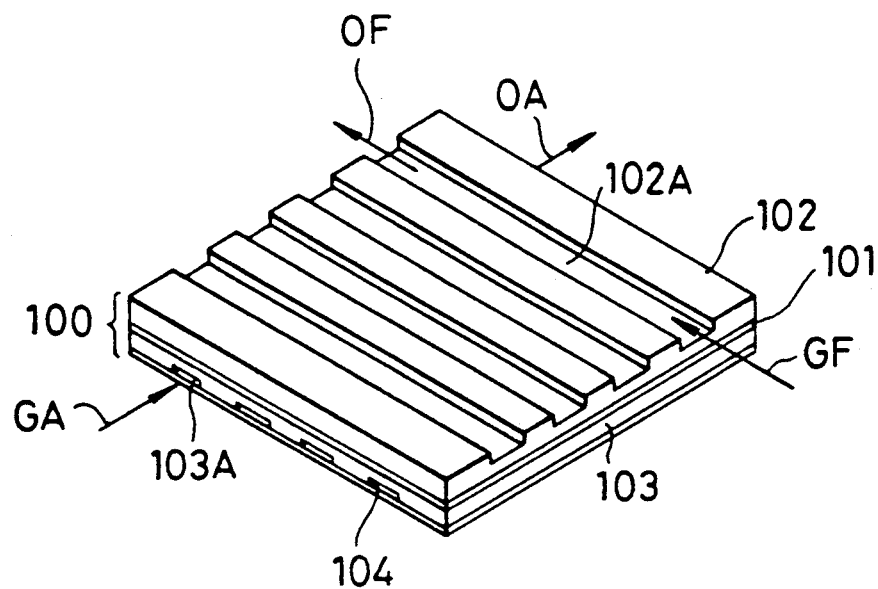
FIG. 1 is a perspective view showing an example of the structure of the unit cell of a well known fuel cell.
Figure 2:
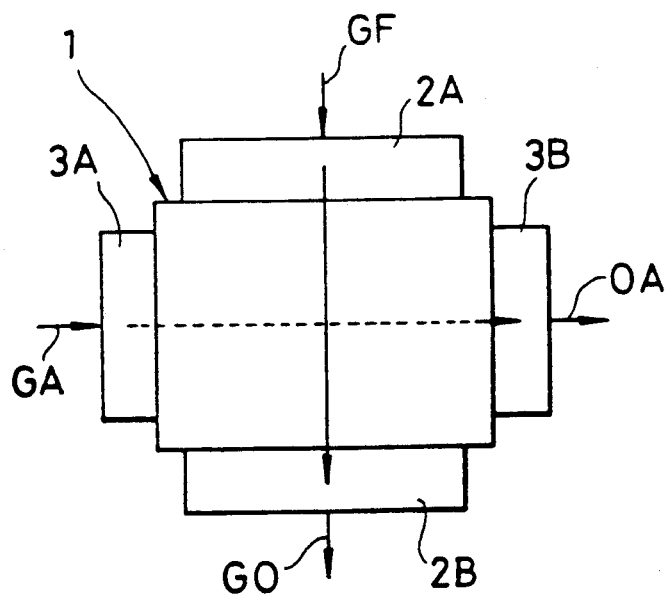
FIG. 2 is a schematic view showing the conventional fuel cell stack.
Figure 3:
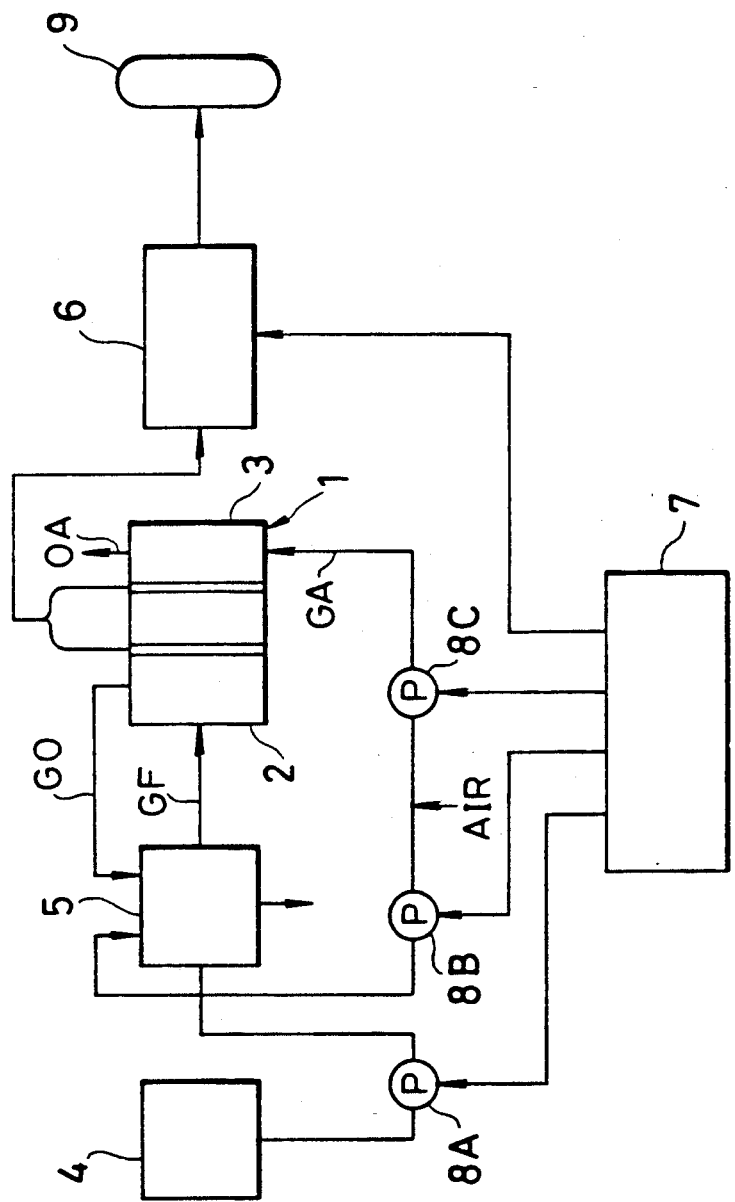
FIG. 3 is a system flow chart in a simplified view showing the conventional construction of a fuel cell power generation system.
Figure 4:
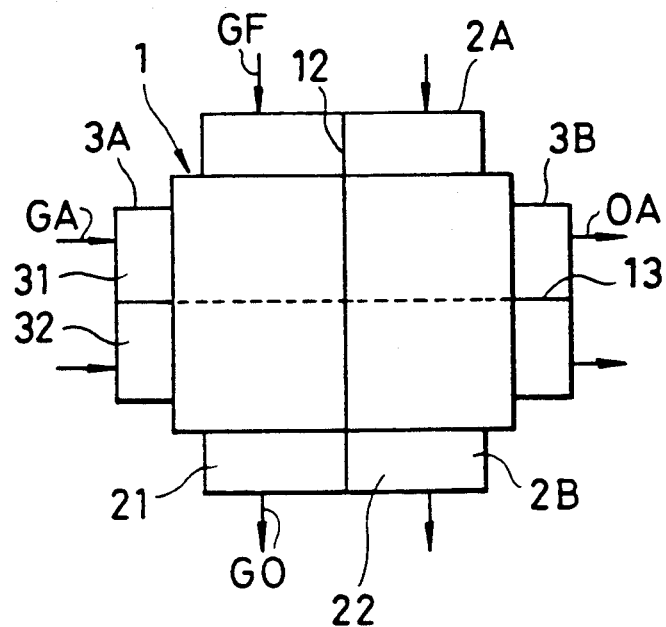
FIG. 4 is a schematic view showing the reaction gas chamber of the fuel cell stack in the fuel cell power generation system according to one embodiment of the present invention.
Figure 5:
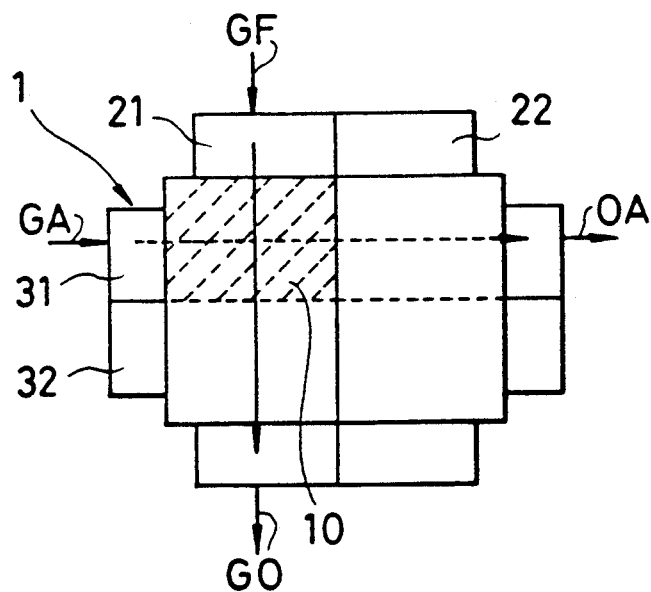
FIG. 5 is a schematic view of the fuel cell stack showing the state of supply of reaction gas at a low load factor according to one embodiment of the present invention.
Figure 6:
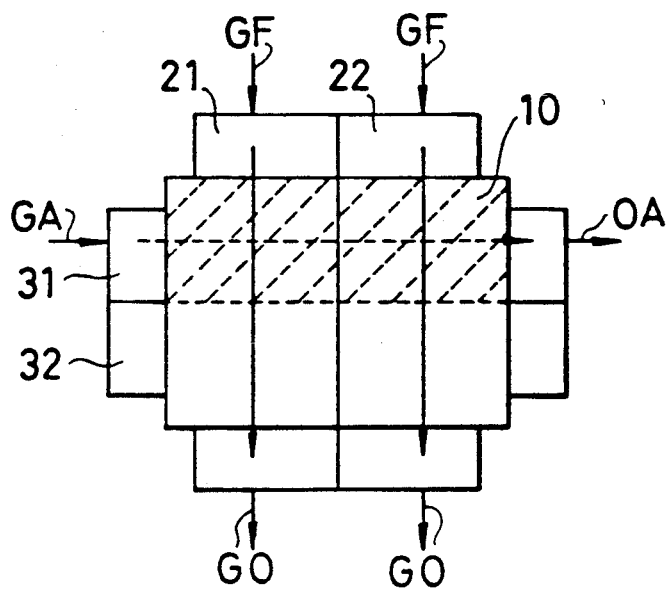
FIG. 6 is a schematic view of the fuel cell stack showing the state of supply of reaction gas at a medium load factor according to one embodiment of the present invention.
Figure 7:
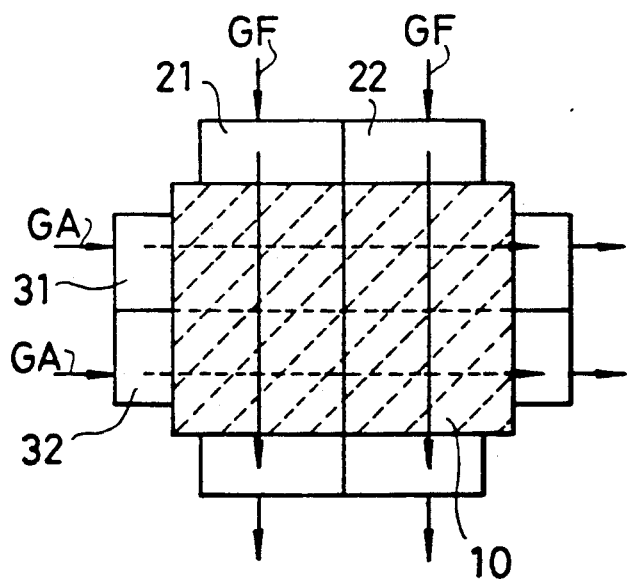
FIG. 7 is a schematic view of the fuel cell stack showing the state of supply of reaction gas at a high load factor according to one embodiment of the present invention.

FIG. 4 is a schematic cross-sectional view showing the reaction gas chamber of the fuel cell stack in the fuel cell power generation system according to the first embodiment of the present invention. FIGS. 5, 6 and 7 are schematic views explaining the states of supplying reaction gas at different load factors. In FIGS. 4 to 7, an inlet port side manifold 2A and an outlet port side manifold 2B for supplying and discharging, respectively, a fuel gas GF (one component gas of a reaction gas) communicated to the fuel gas passage (102A in FIG. 1) of the stack 1 are partitioned in the inside thereof into two component manifold portions by a manifold partition plate 12 in a direction perpendicular to the lamination surface of the unit cell (i.e., in a direction of gas flow). On the other hand, a pair of manifolds, i.e., an inlet port side manifold 3A and an outlet port side manifold 3B, for supplying and discharging, respectively, reaction air GA (another component gas of the reaction gas) are also partitioned by a manifold partition plate 13 similarly. As a result, a plurality of fuel gas passages 102A and a plurality of reaction gas passages 103A each in the form of a groove communicating to the manifold are divided into two groups by the partition plates 12 and 13, respectively. Thus the manifolds 2A and 2B and the fuel gas passage 102 together define a fuel gas chamber, which is also separated into two divided or component fuel gas chambers (or gas chambers) 21 and 22. Similarly, a reaction air chamber defined by the manifolds 3A and 3B and the air passage 103A is separated into two divided air chambers (gas chambers) 31 and 32. Each of the divided gas chambers 21, 22, 31 and 32 have respective inlet ports and outlet ports for supplying and discharging, the reaction gas and is provided with on each inlet port side and outlet port side a control valve (not shown) serving as flow rate controlling means for controlling the flow rate of the reaction gas. The supply and discharge of the reaction gas, i.e., fuel gas GF or reaction air GA, can be controlled on on-off basis by operating the control valves by opening or closing them depending on the load factors of the system.

More particularly, as shown in FIG. 5, when the control valves are operated so that the divided fuel chamber 21 and the divided air chamber 31 can be supplied with the fuel gas GF and reaction gas GA, respectively, the fuel gas GF and the reaction air GA form streams perpendicular to each other via the electrodes in only the portion hatched in a broken line in the electrode surface area of the stack 1. As a result, an effective power generation surface area 10 decreases to about $\theta$ of the entire electrode surface area.

As shown in FIG. 6, when the reaction gas is supplied to the divided fuel chamber 21 and 22 and the divided air chamber 31, the effective power generation surface area 10 becomes about ½ time the entire electrode surface area.

Further, as shown in FIG. 7, the reaction gas was supplied to all of the divided fuel chambers 21 and 22, and the divided air chambers 31 and 32, the entire electrode surface area serves as the effective power generation surface area 10.

In the instant embodiment, the effective power generation surface area 10 of the stack can be controlled and switched in three stages or steps of ¼, ½ and 1/1 time the entire electrode surface area of the stack by changing the manner of supply of the reaction gas to the divided gas chambers. When the switching operation for switching the reaction gas supply rate is set to be performed in three stages of load factor, i.e., no higher than 25%, 25 to 50%, and 50 to 100%, the operation of power generation equivalent to a load factor of no higher than 25%, 25 to 50%, and 50 to 100% can be carried out.

Figure 8:
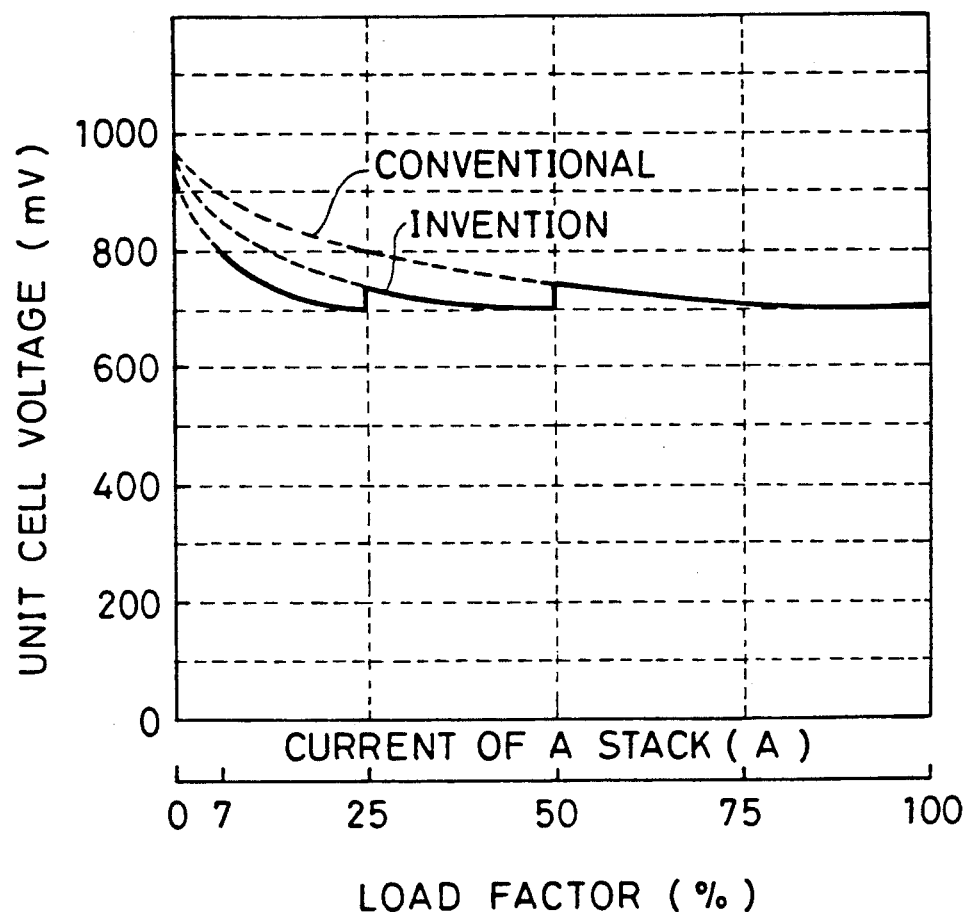
FIG. 8 is a graph illustrating voltage vs. load factor characteristics of unit cell according to one embodiment of the present invention.

FIG. 8 is a graph showing a unit cell voltage vs. load factor characteristics according to the instant embodiment. In FIG. 8, the characteristics curve of the conventional fuel cell stack indicated in a broken line shows that the unit cell voltage exceeds 800 mV at a load factor of no higher than 25%. On the contrary, int he characteristics curve according to the instant embodiment, high voltages exceeding 80 mV will not be generated until the load factor decreases to 7% or lower.

Since generally the power generation system consumes power for auxiliaries on the order of several % at such a low load factor, the power generation system of the instant embodiment is advantageous in that it does not generate high potentials which would cause almost no deterioration of the characteristics of fuel cells and in addition the system is provided with a discharge resistor for preventing the generation of such a high potential, and the system does not have to generate power which could otherwise be wasted, thus saving fuel.

Further, the fuel cell in the power generation system of the instant embodiment can vary the effective surface which are actually utilized for power generation depending on variation of the load on the system. Therefore, if difference in time during which a portion of the entire electrode surface area actually used in the power generation varies considerably from portion to portion, there occurs difference in remaining service life of the fuel cell from portion to portion. Accordingly, adverse influences on the remaining service life of the fuel cell can be avoided by controlling the supply and discharge of the reaction gas so as to change the combination of the divided fuel chamber and divided air chamber for supplying the reaction gas for every predetermined period of time, e.g. for every 200 hours.

Embodiment 2

Figure 9:
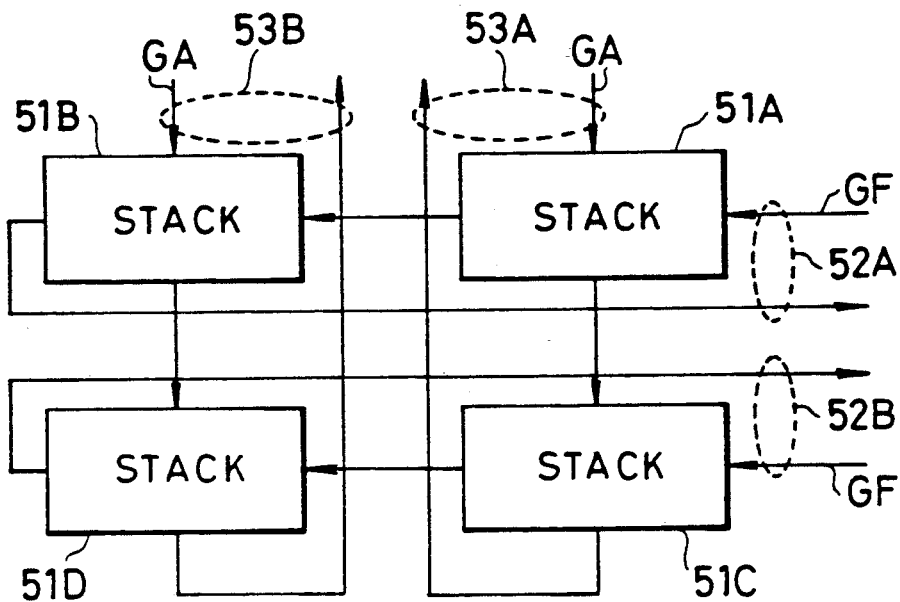
FIG. 9 is a gas flow chart showing gas flow among a plurality of the stacks in the fuel cell power generation system according to another embodiment of the present invention.
Figure 10:
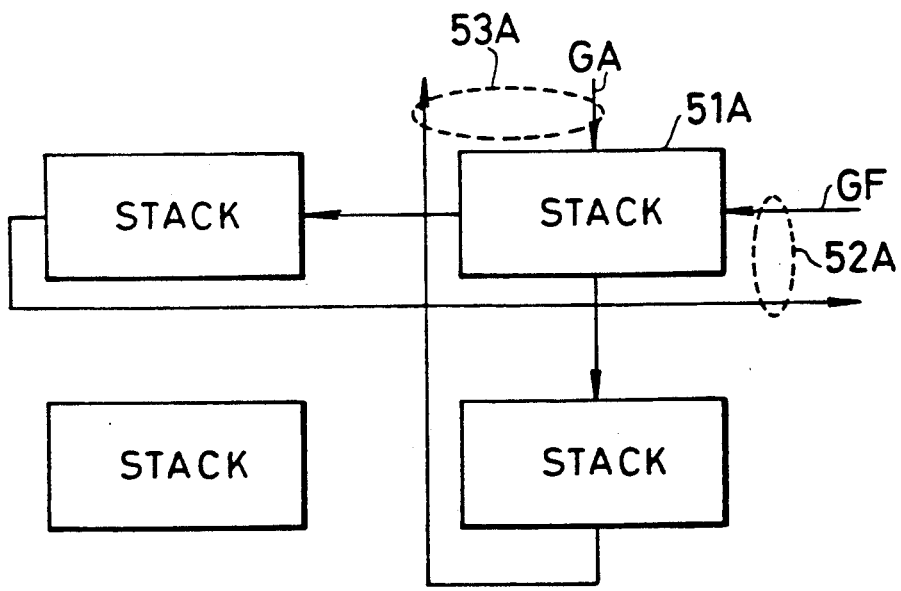
FIG. 10 is a gas flow chart showing gas flow among a plurality of the stacks at a certain load factor according to another embodiment of the present invention.
Figure 11:
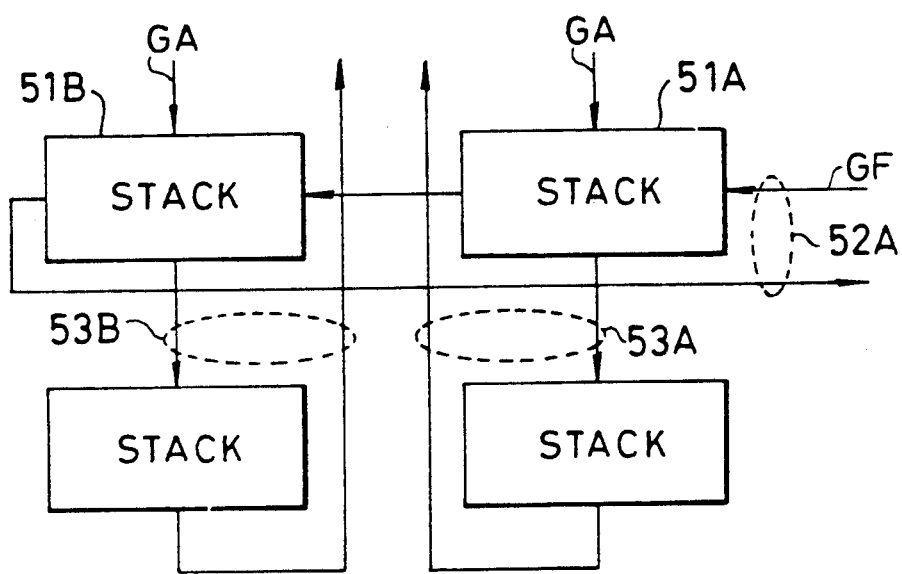
FIG. 11 is a gas flow chart showing gas flow among a plurality of the stacks at another load factor according to another embodiment of the present invention.

FIG. 9 is a gas flow chart showing gas flow among a plurality of the stacks in the fuel cell power generation system according to the second embodiment of the present invention. FIGS. 10 and 11 illustrate the supply of the reaction gas at different load factors from each other, in the fuel cell power generation system of the instant embodiment. In FIG. 9, the fuel cell includes four fuel cell stacks 51A, 51B, 51C and 51D. Two series-connected fuel chambers 52A and 52B are formed by connecting in series the respective fuel gas chambers of the stacks 51A and 51B with respective pipings. Similarly, two series-connected air chambers 53A and 53B are formed by connecting in series the respective air chambers of the stacks 51A and 51C with respective piping. On each outlet port of the series-connected chambers is provided with a control valve (not shown) (flow rate controlling means), with which switching operation for changing the combination of the series-connected fuel chambers and series-connected air chambers actually supplying the reaction gas is performed. That is, in FIG. 9, when the reaction gas GF is supplied to the series-connected fuel chambers 52A and 52B, and the reaction air GA to the series-connected air chambers 53A and 53B, perpendicularly-crossed streams of the fuel gas and of the reaction air are formed in the unit cells in all the four fuel cell stacks, and thus the four stacks each contribute to power generation.

As shown in FIG. 10, when the reaction gas is supplied to the series-connected fuel chambers 52A and series connected air chambers 53A, perpendicularly-crossed streams are formed in only the stack 51A and the number of the stacks which actually contribute to power generation can be limited to one.

Further, as shown in FIG. 11, the supply of the reaction gas to the series connected fuel chambers 52A and the two series-connected air chambers 53A and 53B results in the limitation of the stacks actually contributing to power generation to only two stacks, i.e., the stacks 51A and 51B.

Therefore, by supplying the reaction gas in the combination of the gas chambers as shown in FIG. 9, FIG. 10 or FIG. 11 with controlling its flow rate depending on a load factors 50 to 100%, no higher than 25%, or 25 to 50%, the load factor of the stack contributing the operation of power generation can be increased similarly to Embodiment 1, thus not only avoiding the danger of the unit cells being exposed to high potentials but also retaining power generation at high efficiencies because the amount of the reaction gas can be changed depending on the change of the load factor.

In addition, switching of the combination of the series-connected fuel chambers and series-connected air chambers to which the reaction gas is supplied at light load factors for every predetermined period of time makes the remaining service lives of the stacks uniform and thus is advantageous.

As described in the foregoing, the fuel cell power generation system of the present invention is constructed such that a single fuel cell stack includes a plurality of divided fuel chambers and a plurality of divided air chambers partitioned or a plurality of fuel cell stacks are connected to each other so that respective fuel chambers and air chambers are connected in series to form a plurality of series fuel cambers and a plurality of an series air chambers, and the reaction gas is supplied to selected divided fuel chambers and divided air chambers, or to selected series fuel chambers or series air chambers, selected depending on the stage of load factor. As a result, it is possible to change stepwise the surface area of the electrodes or number of stacks actually contributing to power generation depending on the load factor of the system. This overcomes the problem encountered with the conventional system that conventionally decrease of the load factor to a level of no higher than 25% results in increase of unit cell voltage to a value exceeding 0.8 V, which causes the deterioration of the electrode medium layer, and thus aggravation of the performance of the fuel cell. Further, since the conventional countermeasure for avoiding the occurrence of high voltages by the provision of a discharge resistor to save power generated become useless, high power generation efficiencies can be attained with the fuel cell power generation system of the invention without causing the deterioration at high potentials even at light loads.

According to the present invention, the light load region where the load factor of the portion actually contributing to power generation is maintained to a level of 50% or higher can be increased considerably. Therefore, the present invention can provide a fuel cell power generation system which does not cause the deterioration of the electrodes by overvoltage even when the load factor region is extended to a level exceeding 0.8 V which is currently used as a practical upper limit, due to eventual technological developments such as improvement in the output voltage of the unit cell and the use of higher pressures for the reaction gas.

Furthermore, the remaining service lives of the fuel cell gradually decreasing according as the power generation operation proceeds can be made uniform from unit cell to unit cell by the control by switching the combination of the divided fuel chambers and the divided air chambers selected, or of the selected stacks, for every predetermined period of time.

The present invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A fuel cell power generation system comprising:
   a fuel cell stack made of a laminate of a plurality of unit cells, each of the unit cells having a fuel electrode and an air electrode;
   a fuel processing apparatus for supplying a fuel gas to the fuel electrode of each of the unit cells in the fuel cell stack;
   an air supplying apparatus for supplying air for reaction to the air electrode of the fuel cell stack;
   a power transformer for adjusting output power from the fuel cell stack and supplying the output power to a load;
   a plurality of fuel gas passages formed on each of the unit cells on its side surface of the fuel cell and each having an inlet port and an outlet port, and a plurality of reaction air passages formed on each of the unit cells on its side surface of the air electrode and each having an inlet port and an outlet port, the fuel gas passages being perpendicular to the air gas passages; and
   a pair of first manifolds provided one on a side of the inlet port of, and the other on a side of the outlet port of each of the air passages, and a pair of second manifolds provided one on a side of the inlet port of, and the other on a side of the outlet port of each of the fuel passages;
   wherein each of said first and second manifolds comprises a plurality of component manifold portions divided in a direction of flow of the fuel gas or reaction air; and
   wherein each of said component manifold portions is provided with flow rate controlling means for controlling flow rate of each of said component manifold portions.

2. The fuel cell power generation system as claimed in claim 1, wherein said flow rate controlling means controls a degree of supply of the fuel gas and the reaction air to each of the plurality of the component manifold portions to be set up to one selected from stages of light load factors and switched to another after every predetermined time of operation.

3. A fuel cell power generation system comprising:
   at least four fuel cell stacks each made of a laminate of a plurality of unit cells, each of the unit cells having a fuel electrode and an air electrode;
   a fuel processing apparatus for supplying a fuel gas to the fuel electrode of each of the unit cells in each of the four fuel cell stacks;
   an air supplying apparatus for supplying reaction air to the air electrode of each of the unit cells in each of the fuel cell stacks;
   a power transformer for adjusting output power from each fuel cell stack and supplying the output power to a load connected thereto;
   a plurality of fuel gas passages formed on each of the unit cells on its side surface of the fuel cell and each having an inlet port and an outlet port, and a plurality of reaction air passages formed on each of the unit cells on its side surface of the air electrode and each having an inlet port and an outlet port, the fuel gas passages being perpendicular to the air gas passages; and
   a pair of first manifolds provided one on a side of the inlet port of, and the other on a side of the outlet port of each of the air passages, and a pair of second manifolds provided one on a side of the inlet port of, and the other on a side of the outlet port of each of the fuel passages;
   wherein for at least two of said at least four fuel cell stacks, said fuel gas passages and reaction air passages, respectively, are connected in series, to form a series-connected fuel gas passage assembly having an inlet port and an outlet port, and a series-connected reaction gas passage assembly having an inlet port and an outlet port, respectively; and
   wherein said first manifolds on respective sides of the inlet port and the outlet port of the series-connected fuel gas passage assembly and said second manifolds on respective sides of the inlet port and outlet port of the series-connected reaction air passage assembly are each provided with flow rate controlling means for controlling flow rate of each of the first and second manifolds.

4. The fuel cell power generation system as claimed in claim 3, wherein said flow rate controlling means controls a degree of supply of the fuel gas or the reaction air to each of the manifolds on the side of the inlet portions to be set up to one selected from stages of light load factors and switched to another after every predetermined time of operation.

* * * * *